Feb. 28, 1928.

T. J. MARTIN

FLUID MEASURING DEVICE

Filed May 14, 1927

Feb. 28, 1928.
T. J. MARTIN
1,660,757
FLUID MEASURING DEVICE
Filed May 14, 1927    3 Sheets-Sheet 3
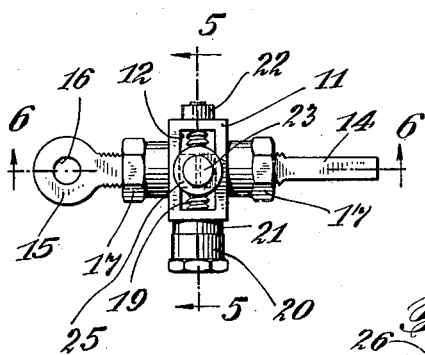
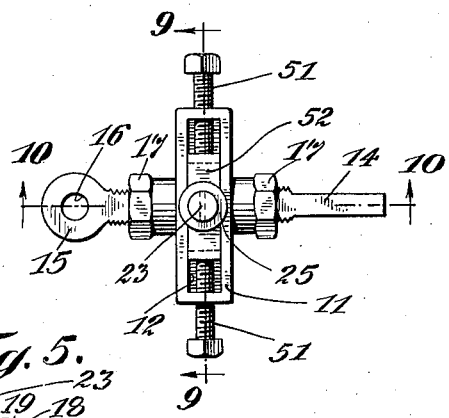
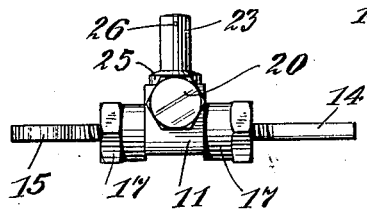
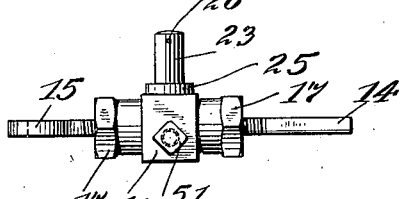
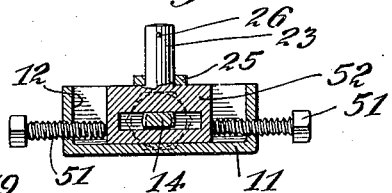
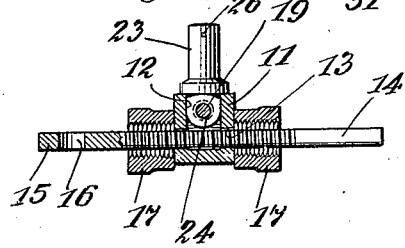
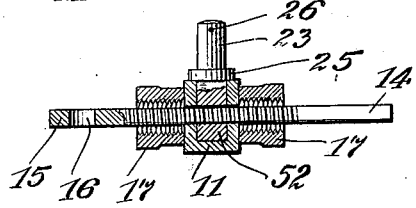

Patented Feb. 28, 1928.

1,660,757

UNITED STATES PATENT OFFICE.

THOMAS J. MARTIN, OF BROOKLYN, NEW YORK.

FLUID-MEASURING DEVICE.

Application filed May 14, 1927. Serial No. 191,467.

My invention relates to devices suitable for the measurement of fluids and is particularly adaptable for the measurement of gases.

In order to explain the construction and operation of my device, I will describe it in combination with an ordinary gas meter, although its application is not limited to that particular use.

The amount of gas passing through a gas meter is controlled by a pair of bellows with co-operating slide valves governing the entrance and exit of the gas into and from the bellows.

The amount of gas passing through the meter is dependent upon the capacity of the bellows and this in turn is controlled by the stroke of the bellows during their inflation and deflation periods.

As it is necessary from time to time to change the stroke of the bellows in order to agree with the recording or reading mechanism, devices must be incorporated to accomplish this result.

As the strokes, or movements, of the slide valves must always correspond with the bellows strokes, it is evident that any change in the bellows strokes must result in a timing of the valve strokes to agree therewith.

The object of my invention is a device which will control both the strokes of the bellows and the movements of the slide valves without the disengagement of any of the mechanism, this important and valuable result being accomplished by a slight movement and change of position of the elements of my device.

My device, therefore, presents a means whereby the capacity of the bellows may be properly fixed and the necessary corresponding changes of the valve movements may be made in an easy and positive manner without disarrangement or alteration of the meter mechanism.

The advantages of my device will be evident upon a consideration of my specification and its accompanying drawings.

In the accompanying drawings illustrating modified forms of my device similar parts are designated by similar numerals.

Figure 3 is a top view of one form of the device of my invention.

Figure 4 is a side view of Figure 3.

Figure 5 is a cross-section through the line 5—5 of Figure 3.

Figure 6 is a cross-section through the line 6—6 of Figure 3.

Figure 7 is a top view of a modified form of my device.

Figure 8 is an end view of Figure 7.

Figure 9 is a cross-section through the line 9—9 of Figure 7.

Figure 10 is a cross-section through the line 10—10 of Figure 7.

Figure 1:
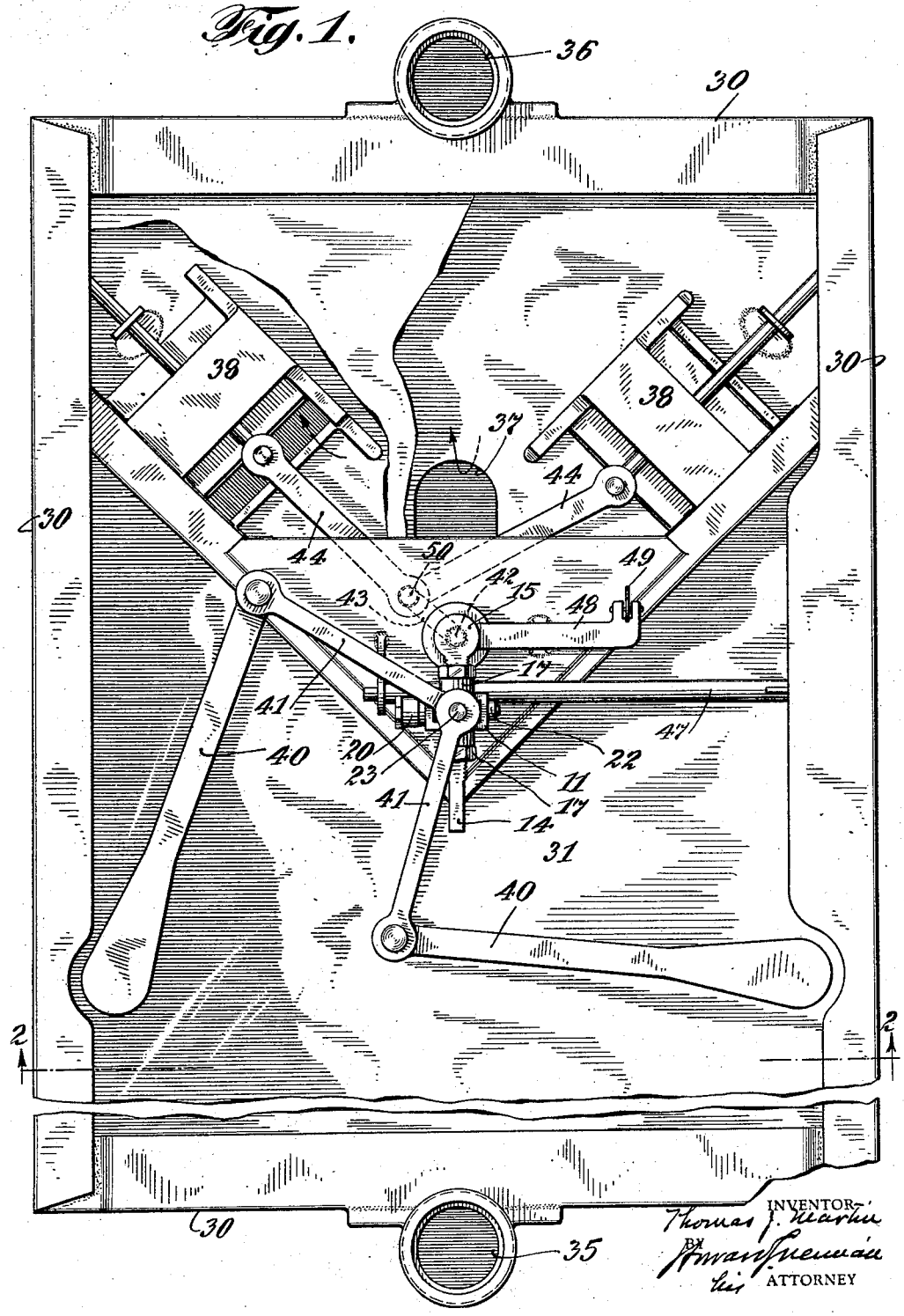
Figure 1 is a top view of a gas meter with my device installed.

The particular form of the device of my invention shown in Figures 1 to 6 inclusive comprises a rectangularly shaped base member 11 having a recess 12 within one side thereof and a hole, or opening, 13 passing therethrough at right angles to the recess 12. Passing through the hole 13, and slidable therein, is a connecting pin 14, one end of which 15 is expanded and has an opening or eye 16. The connecting pin 14 is threaded and carries the two internally threaded lock-nuts 17, 17. Through the oppositely opposed holes 18, 18 of the base 11 extends the threaded bolt 19 having the fixed head 20, the washer 21 and the lock-nut 22. The connecting pin 14 and the threaded bolt 19 are thus positioned at right angles to each other. A connecting pin 23 has a threaded opening 24 meshing with the threads of the bolt 19, a shoulder 25 and a cotter-pin hole 26. The revolution of the threaded bolt 19 will move the connecting pin 23 longitudinally of the recess 12 and the base 11.

Figure 2:
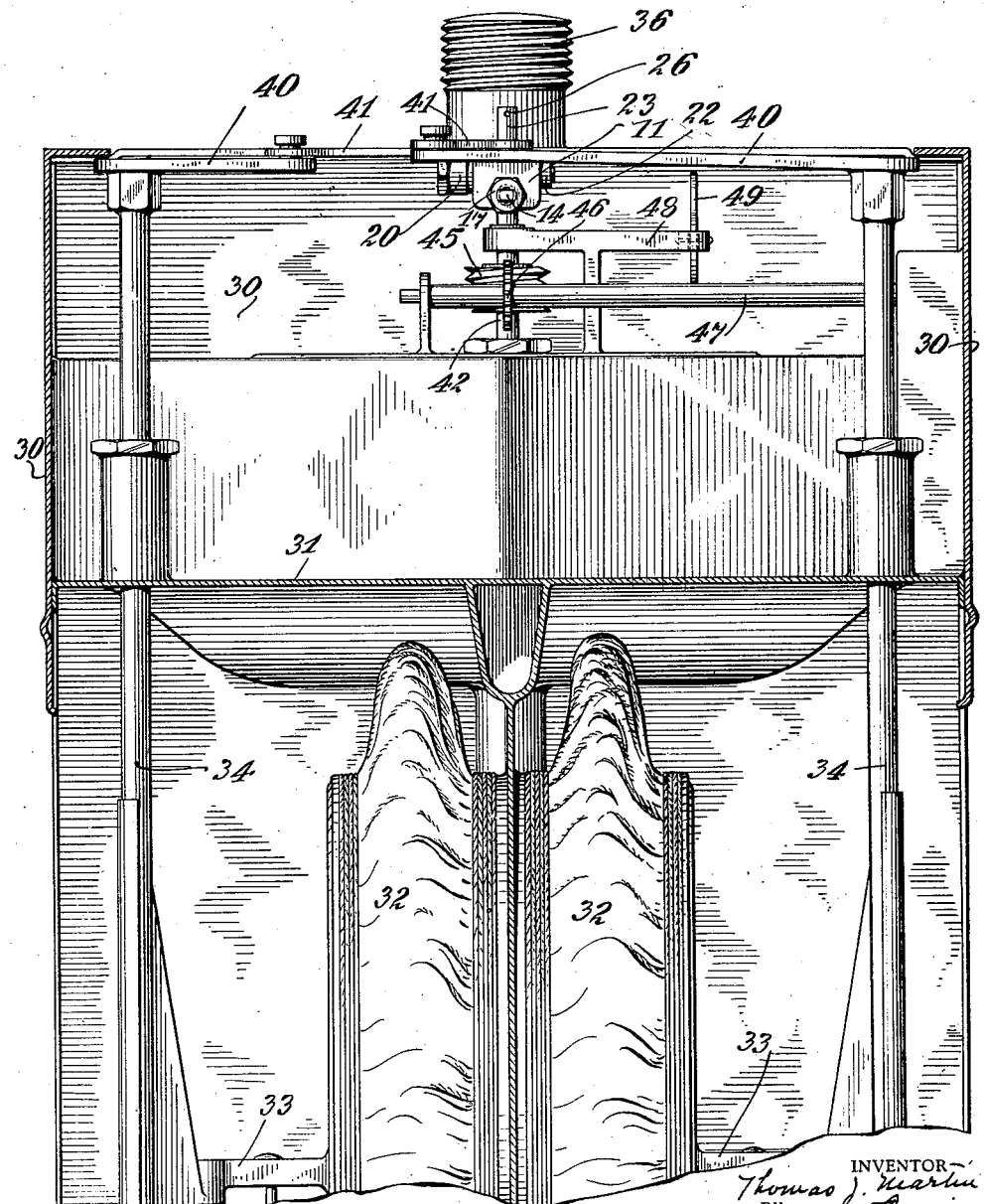
Figure 2 is a cross-section through the line 2—2 of Figure 1.

In Figures 1 and 2 showing the application and use of my device, there are shown the sides 30, 30, 30, 30, and the upper transverse horizontal partition 31. The bellows 32, 32 are inflated and deflated by means of the pivotal arms 33, 33 fixedly attached to the revoluble shafts 34, 34. Pipe 35 is the means for gas entrance and pipe 36 is the means for gas exit. The conduit 37 allows of the entrance of the gas from the source of supply into the chamber above the partition 31, a portion of the top chamber being shown, and the slide valves 38, 38, acting alternately, allow of the passage of the gas from the gas chamber outwardly through the exit pipe. The drawings show the ordinary form of gas meter construction.

Fixedly attached to each bellows shaft 34 is a rocker-arm 40, to which is pivotally attached a flag arm 41, each flag arm having an opening capable of fitment over the connecting pin 23. The opening 16 of the connecting pin 15 is passed over the revoluble shaft 42 and fixedly attached to the shaft 42 is a link 43, to which are pivotally attached the rocker-arms 44, 44, each of which is pivotally attached to a slide valve 38. A worm gear 45 fixedly attached to the shaft 42 meshes with the gear 46 fixedly attached to the shaft 47. The revolution works the recording mechanism not shown. An arm 48, carries the pivotal catch 49 to prevent the reverse movement of the mechanism.

The operation of my device for standardizing the bellows capacity and regulating the valve movments is as follows:

The contents of a bellows is determined by its inflation and deflation strokes which are governed by the amount of revolution of a bellows shaft 34, and this in turn is controlled by the distance of the extremities of the flag arms 41, 41 from the shaft 42 around which they revolve. Hence the bellows capacity is controlled by the distance between the connecting pin 23 and the shaft 42, which distance is set by loosening the lock-nuts 17, 17 positioning the pin 23 and resetting the lock-nuts.

It is evident that any change made in the bellows strokes must be compensated by changing, or timing the valve's strokes in order that they may co-operate therewith, and this is governed by the comparative distance between the connecting pin 23 and the shaft 42 and the distance between the shaft 42 and the pivotal point 50. To change these to a proper relationship the lock-nut 22 is loosened and the bolt 20 revolved until the pin 23 is in proper position and the lock-nut 22 replaced.

It will thus be noted that both the capacity of the bellows and the timing of the valves can be accomplished by revolutions of proper elements of my device without disconnecting it from the shaft to which it must be attached for regular operation.

The modified form of my device shown in Figures 7 to 10 inclusive, is similar to that above described except that the pin 23 is moved longitudinally by two opposed threaded bolts 51, 51, operating against the lengthened member 52 of the pin 23. The bolts 51, 51 thus dispense with the use of the threaded bolt 19 of the device previously described.

I do not limit myself to the particular size, shape, number or arrangement of parts as shown and described, as these are given simply as a means for clearly describing my invention.

What I claim is:—

1. In a fluid regulating device, in combination, a base member having a longitudinal recess therein, a connecting pin slidable within said recess and extending above the base, means for fixing the connecting pin in predetermined positions within the recess and, a second connecting pin carried by and movable within the base and means for fixing the second connecting pin in predetermined positions within the base.

2. In a fluid regulating device, in combination, a base member having a longitudinal recess therein, a connecting pin slidable within said recess and extending above the base, means for fixing the connecting pin in predetermined positions within the recess and, a second connecting pin having an eye within one end thereof carried by and movable within the base and means for fixing the second connecting pin in predetermined positions within the base.

3. In a fluid regulating device, in combination, a base member having a longitudinal recess therein, a threaded bolt extending through and revoluble within opposite sides of the base and within the recess, a connecting pin having an internally threaded opening through which the threaded portion of the bolt passes and is meshed, means for preventing the revolution of the bolt, a second connecting pin carried by and movable within the base and means for fixing the second connecting pin in predetermined positions within the base.

4. In a fluid regulating device, in combination, a base member having a longitudinal recess therein, a threaded bolt extending through and revoluble within opposite sides of the base and within the recess, a connecting pin having an internally threaded opening through which the threaded portion of the bolt passes and is meshed, means for preventing the revolution of the bolt, a second connecting pin having an eye within one end thereof carried by and movable within the base and means for fixing the second connecting pin in predetermined positions within the base.

5. In a fluid regulating device, in combination, a base member having a longitudinal recess therein, a threaded bolt extending through and revoluble within opposite sides of the base and within the recess, a connecting pin having an internally threaded opening through which the threaded portion of the bolt passes and is meshed, means for preventing the revolution of the bolt, a threaded second connecting pin carried by and movable within the base and a threaded lock-nut carried by the second connecting pin upon each side of the base.

6. In a fluid regulating device, in combination, a base member having a longitudinal recess therein, a threaded bolt extending through and revoluble within opposite sides of the base and within the recess, a connecting pin having an internally threaded opening through which the threaded portion of the bolt passes and is meshed, means for preventing the revolution of the bolt, a threaded second connecting pin having an eye within one end thereof carried by and movable within the base and a threaded lock-nut carried by the second connecting pin upon each side of the base.

7. In a fluid regulating device, in combination, a base member having a longitudinal recess therein, a connecting pin slidable within said recess and extending above the base, means for fixing the connecting pin in predetermined positions within the recess and, a second connecting pin carried by and movable within the base at right angles to the first mentioned connecting pin and means for fixing the second connecting pin in predetermined positions within the base.

8. In a fluid regulating device, in combination, a base member having a longitudinal recess therein, a threaded bolt extending through and revoluble within opposite sides of the base and within the recess, a connecting pin having an internally threaded opening through which the threaded portion of the bolt passes and is meshed, means for preventing the revolution of the bolt, a second connecting pin carried by and movable within the base at right angles to the first mentioned connecting pin and means for fixing the second connecting pin in predetermined positions within the base.

9. In a fluid regulating device, in combination, a base member having a longitudinal recess therein, a threaded bolt extending through and revoluble within opposite sides of the base and within the recess, a connecting pin having an internally threaded opening through which the threaded portion of the bolt passes and is meshed, means for preventing the revolution of the bolt, a threaded second connecting pin carried by and movable within the base at right angles to the first mentioned connecting pin and a threaded lock-nut carried by the second connecting pin upon each side of the base.

Signed at New York city in the county of New York and State of New York this 12th day of May, 1927.

THOMAS J. MARTIN.